United States Patent [19]
Davis

[11] Patent Number: 5,458,187
[45] Date of Patent: Oct. 17, 1995

[54] DUAL CORE AIR-TO-AIR HEAT EXCHANGER

[75] Inventor: George B. Davis, Frederick, Md.

[73] Assignee: Honeywell Inc., Minneapolis, Minn.

[21] Appl. No.: 160,523

[22] Filed: Dec. 1, 1993

[51] Int. Cl.$^6$ .................................. F28D 9/00; F24H 3/10
[52] U.S. Cl. ........................ 165/54; 165/165; 165/166; 165/909
[58] Field of Search ................. 165/54, 909, 166, 165/17, 165

[56] References Cited

U.S. PATENT DOCUMENTS

| 850,784 | 4/1907 | Richmond | 165/54 |
|---|---|---|---|
| 2,092,835 | 9/1937 | Edwards | 165/909 |
| 2,945,680 | 7/1960 | Slemmons | 165/166 |
| 3,640,340 | 2/1972 | Leonard et al. | 165/166 |
| 4,040,804 | 8/1977 | Harrison | 165/909 |
| 4,042,018 | 8/1977 | Zebuhr | 165/166 |
| 4,497,362 | 2/1985 | Teague, Jr. | 165/909 |
| 5,238,052 | 8/1993 | Chagnot | 165/54 |

FOREIGN PATENT DOCUMENTS

| 1592524 | 6/1970 | France | 165/166 |
|---|---|---|---|
| 2947432 | 5/1981 | Germany | 165/54 |
| 3327685 | 2/1985 | Germany | 165/54 |
| 3514474 | 10/1986 | Germany | 165/166 |
| 0049793 | 3/1982 | Japan | 165/166 |
| 82284 | 8/1953 | Norway | 165/166 |
| 647699 | 12/1950 | United Kingdom | 165/166 |
| WO81-02060 | 7/1981 | WIPO | 165/166 |

OTHER PUBLICATIONS

"Z Duct Energy Recovery Unit" publication of Deschamps Energy Labs Inc, East Hanover N.J., (Mar. 1975).
Air–to–Air Heat Exchangers Directory & Buyer's Guide, Cutler Information Corp., 1987.

Primary Examiner—John K. Ford
Attorney, Agent, or Firm—Ian D. MacKinnon

[57] ABSTRACT

An air exchanger for continuously exchanging indoor air with outdoor air to provide a constant supply of fresh air into a structure which includes a heat exchanger having a continuous structure which defines adjacent first and second sets of channels which open toward opposite sides of the air exchanger. The air exchanger draws outdoor air through the first set of channels in a first direction and indoor air through the second set of channels in a second, counter-direction. Heat is transferred between the indoor and outdoor air streams such that when the outdoor air enters the room, its temperature approaches the indoor temperature and indoor heating or cooling effects are minimized.

15 Claims, 6 Drawing Sheets

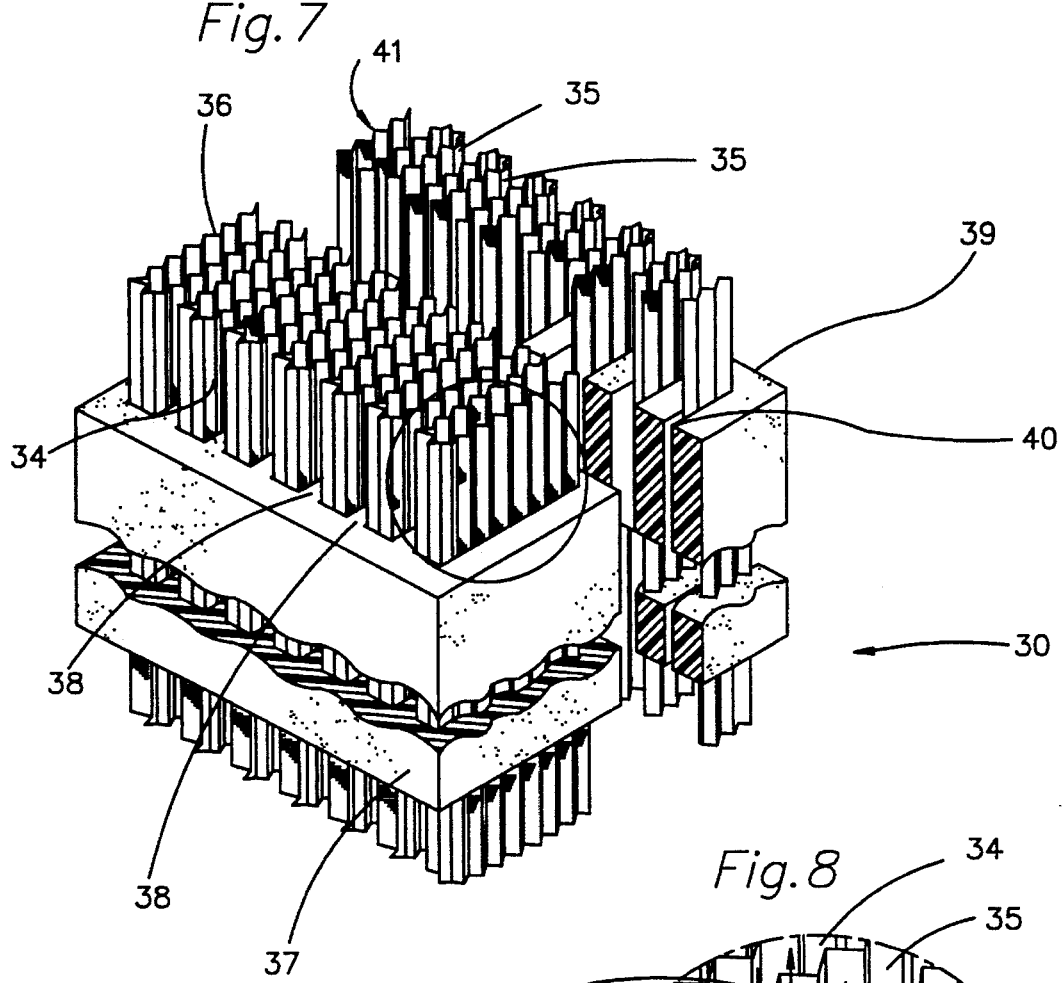
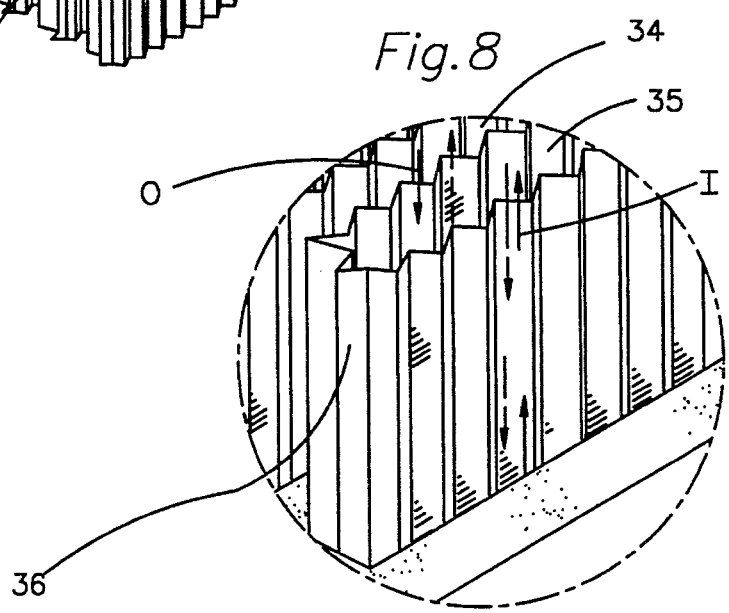

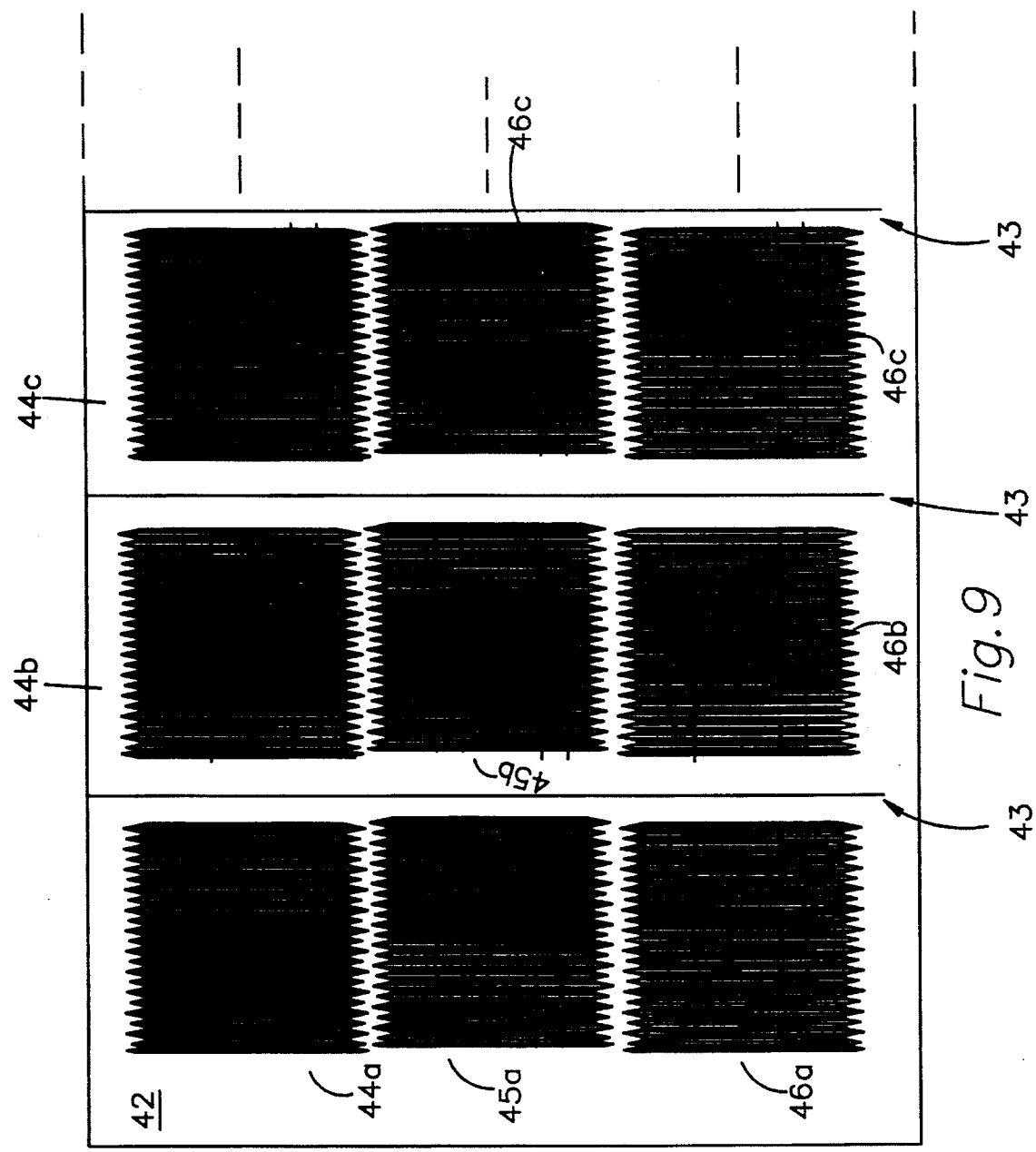

DUAL CORE AIR-TO-AIR HEAT EXCHANGER

BACKGROUND OF THE INVENTION

This invention relates to an air exchanger for replacing indoor air in an enclosure with outdoor air and, more particularly, to an air exchanger which includes a heat exchanger which changes the temperature of the outdoor air such that it enters the room at a temperature approaching that of the indoor air temperature.

In recent years there has been an increased emphasis on energy conservation in homes and other buildings in response to increasing fuel costs and decreasing and less readily available worldwide fuel supplies. This emphasis has included efforts to make residential and commercial buildings increasingly energy efficient such that less electricity and heating fuel are required to heat and cool them. Such efforts have included, for example, providing highly insulating multiple pane windows and doors, increasing the insulation ratings in walls, attics and ceilings, providing unique outer wall constructions having closed insulating air gaps, and incorporating radiant energy reflecting materials in buildings. These efforts have substantially reduced energy consumption by decreasing heat transfer between the interiors of the buildings and the outdoors.

Despite the beneficial energy conservation that has been achieved by these efforts, they have at the same time created a number of undesirable and potentially hazardous effects. More particularly, by making buildings more energy efficient by reducing air leakage around windows, doors and other areas, healthful air circulation between the indoors and the outdoors has been significantly reduced. Consequently, the indoor air has become increasingly stale due to a significant increase in the levels of dirt, mold, bacteria, fungus, dust, carbon, nitrogen, radon, and other contaminants which have consequently created unhealthy indoor environments. These undesirable effects have been most pronounced in the colder regions of the United States and in other cold-climate countries, where efforts to decrease energy consumption have been most highly concentrated. Accordingly, in these places, the levels of indoor contaminants have been especially high and have raised the most serious health concerns.

In light of the simultaneous goals of energy conservation and maintaining healthy indoor environments, a number of attempts to make efficient air-to-air heat exchangers have been made. See Energy Design Update, "Air-to-Air Heat Exchangers," 1987 Cutler Information Corp. There is still a need for an air exchanger which is energy efficient and comprises a heat exchanger having a high heat transfer efficiency so that it is capable of continuously supplying fresh outdoor air into a room at a temperature approaching the indoor temperature to minimize any subsequent indoor heating or cooling effects. The air-to-air heat exchanger must provide a significant air exchange without loss of heat and without creating negative pressures inside the home or building.

Such an air exchanger would provide needed air circulation to assure healthy home and workplace environments that, to date, have been sacrificed at the expense of increased energy conservation, without detracting from the energy conservation gains that have been made.

SUMMARY OF THE INVENTION

The present invention has been made in view of the inadequacies of the prior art and has as an object to provide an air exchanger which continuously supplies fresh air to the indoors by constantly exchanging indoor air with outdoor air.

It is another object of the present invention to provide a heat exchanger having a high heat transfer efficiency so that the outdoor air which is preheated or cooled in the heat exchanger will enter a room at a temperature approaching the indoor temperature whereby subsequent indoor heating or cooling effects are minimized.

To achieve the objects of the invention, as embodied and broadly described herein, the air exchanger of the present invention comprises a housing including a front wall, a rear wall, a top wall and a bottom wall. The front wall includes a from air inlet and a front air outlet, and the rear wall includes a rear air inlet and a rear air outlet.

The air exchanger further comprises a heat exchanger for transferring heat between the indoor and outdoor air streams as they travel through the air exchanger. The heat exchanger extends between the top wall and the bottom wall, and has a continuously corrugated and pleated structure which defines a plurality of alternating first channels and second channels. The first channels are open toward the front wall and closed toward the rear wall, and the second channels are open toward the rear wall and closed toward the front wall.

The air exchanger further comprises fans for drawing indoor air in through the front air inlet, and for drawing outdoor air in through the rear air inlet. After entering the air exchanger, the outdoor air traverses the first channels in a first direction and exits the air exchanger through the front air outlet. The indoor air traverses the second channels in a second, opposite direction and exits the air exchanger through the rear air outlet.

BRIEF DESCRIPTION OF THE DRAWING

FIG. 7 is a partially broken-away perspective view of a heat exchanger and surrounding framework in accordance with a preferred embodiment of the invention.

FIG. 8 is an enlarged illustrious view of the encircled portion of FIG. 7.

FIG. 9 is a partially broken-away perspective view of a heat exchanger and surrounding framework in accordance with a second embodiment of the invention.

DETAILED DESCRIPTION OF THE PREFERRED EMBODIMENT

The present invention will now be described in detail with reference to the drawings.

Figure 1:
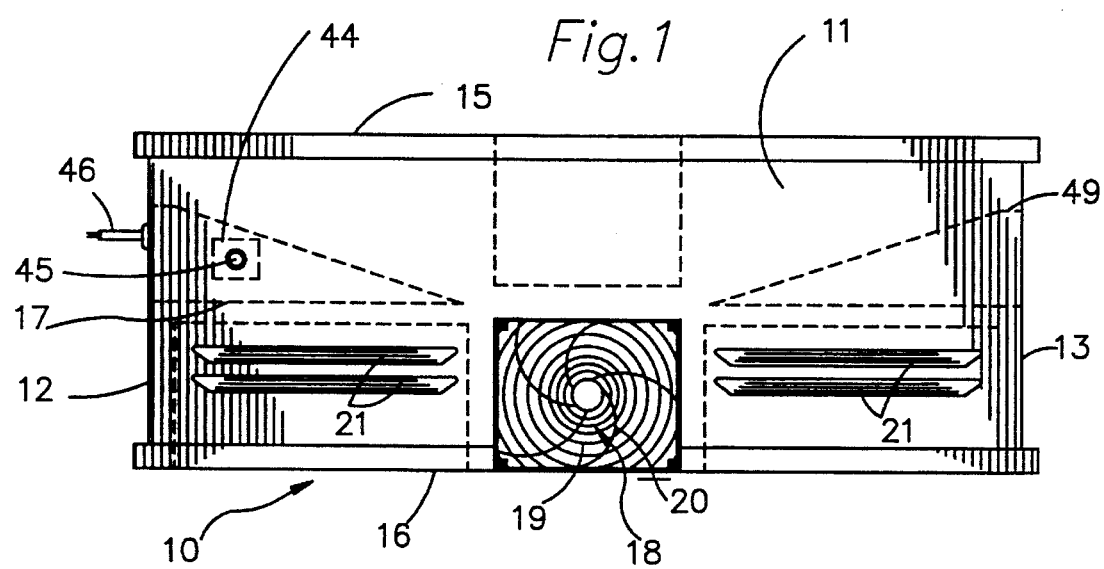
FIG. 1 is a front view of an air exchanger in accordance with a preferred embodiment of the invention.

FIG. 1 illustrates an air exchanger 10 in accordance with a preferred embodiment of the present invention. Also referring to FIG. 2, the air exchanger comprises a rectangular-shaped outer housing including a front wall 11, sidewalls 12 and 13, rear wall 14, top wall 15 and bottom wall 16. An insulating layer 17 (see FIG. 5) composed of a foam material is preferably provided to reduce heat transfer through the walls and to acoustically insulate the air exchanger so that it operates quietly. The insulating layer may be located within the walls of the housing, or it may be proximate to or contacting its interior surface.

The air exchanger 10 has a compact size so that it can be placed in a conventional window. The front wall 11 is positioned so that it faces the interior of the room. It includes a front air inlet 18 through which indoor air is drawn into the air exchanger. The illustrated front air inlet is closed by a protective grille 19. The grille prevents any direct access to an exhaust fan 20 which draws air from the room and through the air exchanger. The illustrated protective grille 18 is mounted to the front wall by fasteners such as screws or the like. The grille may optionally be formed integrally with the front wall.

The front wall 11 includes two pairs of front or incoming fresh air outlets 21 through which outdoor air having passed through the air exchanger enters the interior of a room. The front air outlets are preferably formed as louvers which direct the outdoor air into the room. The front air outlets are approximately equally spaced from air inlet 16 as shown in FIG. 1.

Figure 2:
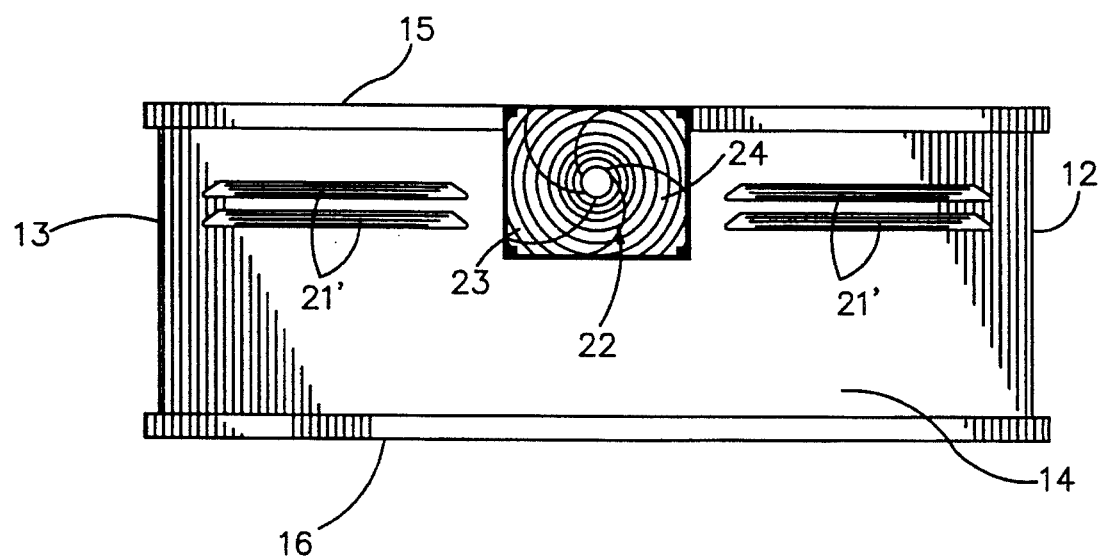
FIG. 2 is a rear view of the air exchanger of FIG. 1.

As illustrated in FIG. 2, the rear wall 14 of the housing, which can be positioned outdoors of the room window, includes a rear air inlet 22 through which outdoor air is drawn into the air exchanger. The rear air inlet 22 preferably has the same size and structure as the front air inlet 18 and includes a grille 23 which covers and prevents access to an intake fan 24 which draws air into the inlet 22 and through the heat exchanger. As shown, inlet 22 is located higher above the bottom wall 16 of the housing than is front air inlet 18.

The rear wall 14 includes two pairs of rear air outlets 21' through which indoor air having passed through the air exchanger exits to the outdoors. The rear air outlets preferably are louvers which direct the indoor air exiting the air exchanger outwardly of the heat exchanger. The rear air outlets are approximately equally spaced from the rear air inlet 22.

Figure 3:
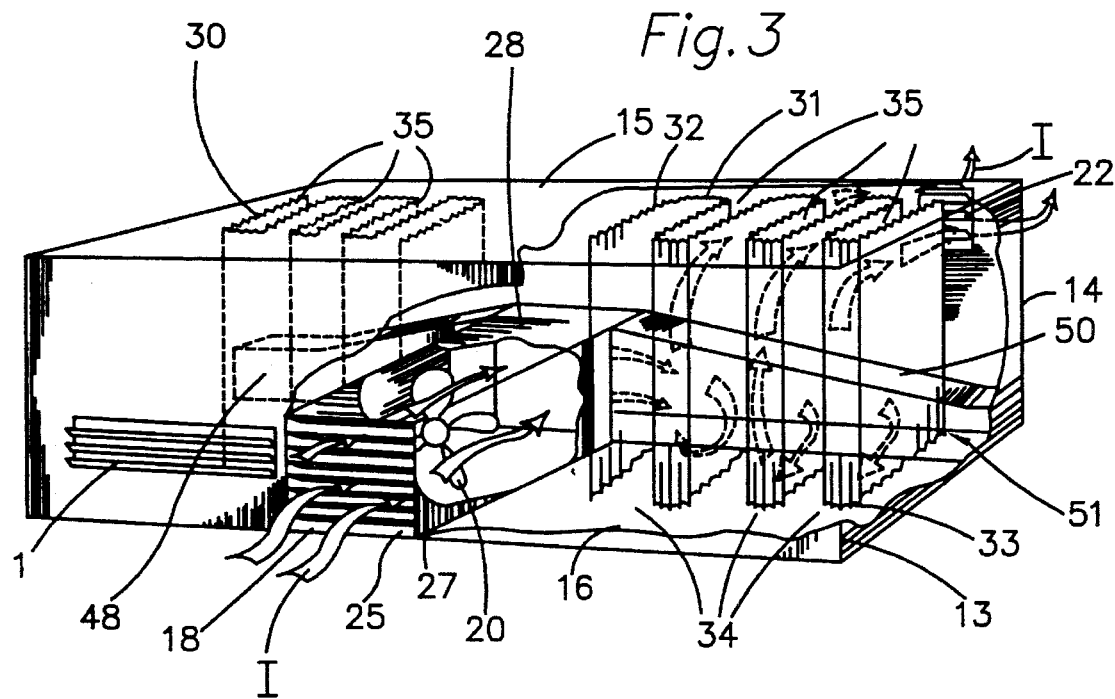
FIG. 3 is a partial cross-sectional illustrious view of the air exchanger of FIG. 1 illustrating the flow of indoor air through the air exchanger.
Figure 4:
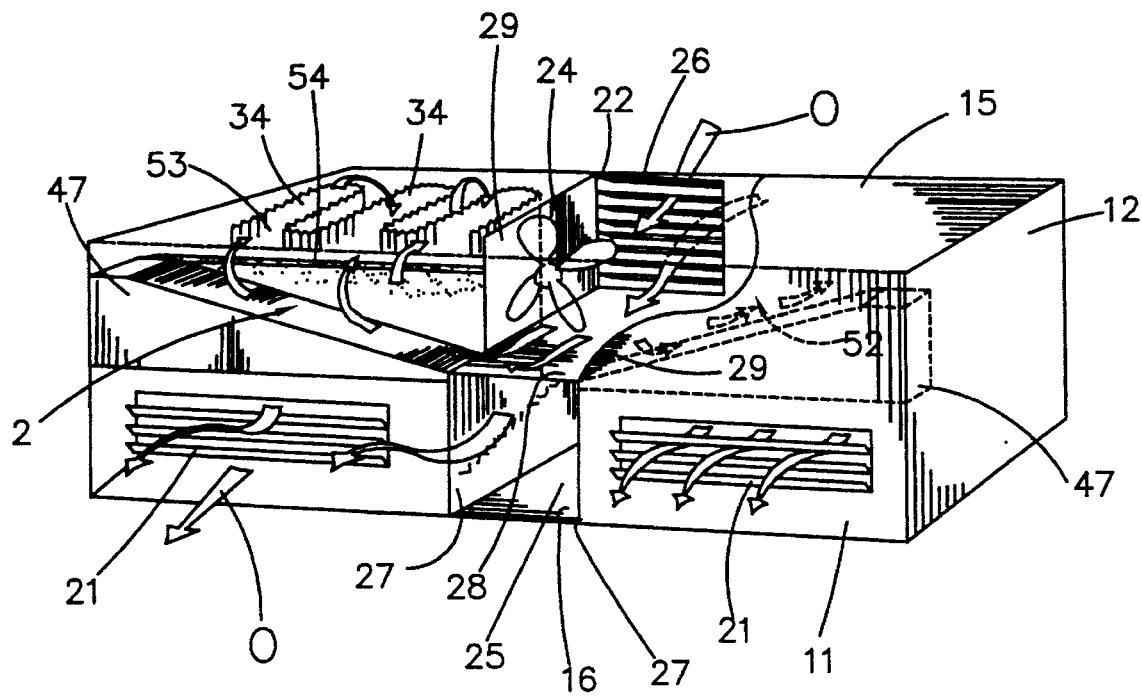
FIG. 4 is a partially cross-sectional illustrious view of the air exchanger of FIG. 1 illustrating the flow of outdoor air through the air exchanger and into the indoor space.

With reference to FIGS. 3 and 4, the air exchanger includes vertically spaced air passages including a lower air passage 25 through which indoor air travels after entering the front air inlet 18, and an upper air passage 26 through which outdoor air travels after entering the rear air inlet 22. The lower air passage is formed by lower parallel vertical walls 27 which extend from the front wall 11 to the rear wall 14, bottom wall 16 and a horizontal wall 28. The upper air passage is formed by upper parallel vertical walls 29 which extend from the front wall 11 to the rear wall 14, top wall 15 and horizontal wall 28. The air passages are separated from each other by the horizontal wall 28 which prevents the indoor and outdoor air streams from mixing.

After the indoor and outdoor air streams traverse the lower and upper air passages, respectively, they are directed toward a pair of heat exchangers 30 and 31 for transferring heat between the indoor and outdoor air streams to either raise or lower the temperature of the outdoor air depending on the relative temperature of the indoor air stream. The heat exchangers are located on opposite sides of the air passages 25 and 26.

The heat exchangers 30 and 31 each extend from the bottom wall 16 upwardly to the top wall 15 of the housing. The upper and lower portions of the heat exchangers are sealed in airtight relationship to the top and bottom walls, respectively, of the air exchanger. The sealant is preferably a liquid sealant which hardens to seal the air exchanger. The airtight seals assure that the indoor and outdoor air streams remain separated from each other as they travel through the heat exchangers.

As shown in FIG. 3, the heat exchangers are formed of a continuous sheet of material which is formed in a somewhat serpentine structure which defines a plurality of alternating first channels 34 and second channels 35 which are separated from each other by generally parallel walls 36. The structure in FIG. 3 is made up of corrugated aluminum which is shown in greater detail in FIG. 7. The walls 36 are as compactly spaced as possible without creating any metal-to-metal contact and are preferably generally parallel to one another. The first channels each open toward the front wall 11 and are closed toward the rear wall 14. The second channels open toward the rear wall and are closed toward the front wall. To achieve a high heat transfer efficiency, the heat exchangers are preferably composed of aluminum-based material having a high thermal conductivity. Although aluminum is the preferred embodiment, others materials, such as polystyrene, may be used. Both polystyrene and aluminum are also lightweight and thus contribute to the low weight of the air exchanger.

As shown in FIG. 7, heat exchanger 30 preferably includes a front separating framework 37, preferably formed of a lightweight material, such as foam or plastic, and having a plurality of parallel spacers 38 which extend at least partially into the first channels toward the rear wall. The spacers prevent the metal-to-metal contact of corrugated walls 36. The spacers also diffuse the air as it flows through the heat exchanger and, thus, increase the efficiency. Rear separating framework 39, also preferably formed of a lightweight material, has a plurality of spacers 40 which extend at least partially into the second channels toward the front wall. Heat exchanger 31 is similar in design to heat exchanger 30.

FIG. 8 is an enlarged view of the encircled portion of heat exchanger 30, illustrated in FIG. 7. The upwardly directed arrows, I, represent the flow of indoor air through the second channels 35, and downward directed arrows, O, represent the flow of outdoor air through the first channels 34. The corrugated walls 36 provide two important functions with respect to the airflow through the heat exchangers. First, the indoor and outdoor air streams are prevented from mixing with each other. Second, the corrugated wall structure provides an increased amount of wall surface area to increase the heat exchange efficiency between the two air streams.

A second embodiment of a heat exchanger utilizes the continuous sheet 42, illustrated in FIG. 9. Lines 43 illustrate the fold lines of the material which allows for the formation of first channels 34 and second channels 36. The material in FIG. 9 is folded in a serpentine manner similar to that of material 41 of FIG. 7. The material for the continuous sheet 42, in FIG. 9, is made up of pleated sections 44, 45 and 46, which are repeatedly placed in a continuous line down the entire length of corrugated material 42 with spaces left for fold lines 43 between each section of pleating. Pleated section 44 is offset from pleated section 45. Pleated section 46 is further offset from pleated section 45. The offset of section 45 from section 46 and section 46 from section 47 is, as shown in FIG. 9, such that the high points of the pleats of each section are not in line. By use of the offset air passages, turbulence is caused, and mixing of the air is provided. This prevents total lamination of airflow, ensuring the optimum contact of air with heat exchange surfaces.

Figure 10:
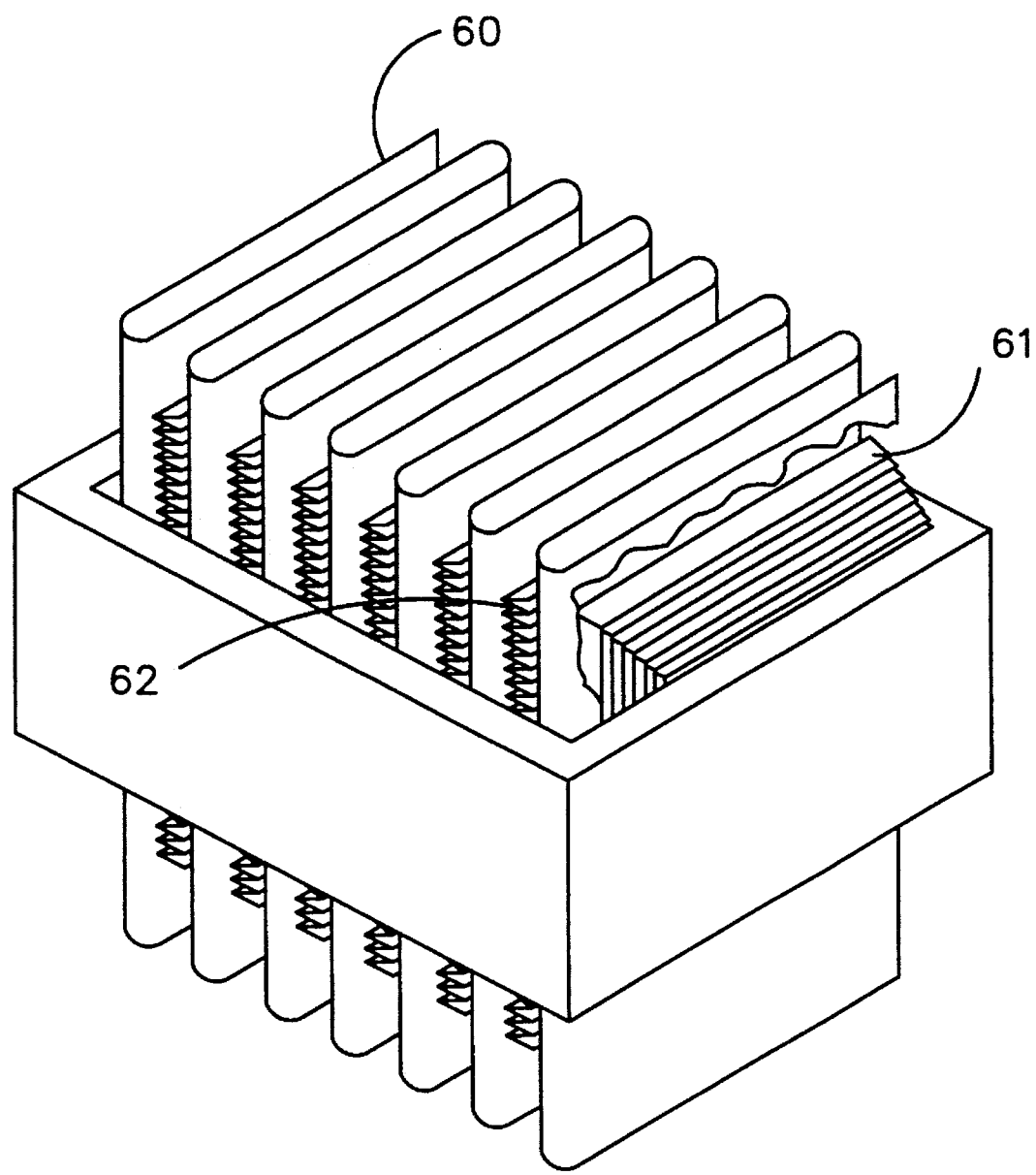
FIG. 10 is a partially broken-away perspective view of a heat exchanger and surrounding framework in accordance with a third embodiment of the invention.

FIG. 10 illustrates a third embodiment of heat exchanger 30 and 31. The continuous sheet of material 60 is now wound in a serpentine manner around spacers 61 & 62. Spacers 61 & 62 are made up of a lightweight material, such as polystyrene. Spacers 61 & 62 are corrugated to form passages such that air is forced into the heat core. The pleats of section 61 and 62 as shown in FIG. 10 are formed in the shape of a "C" and direct the air flow through the passages. To prevent intermingling of air flow the top and bottom of material 60 is sealed as described in FIG. 3. The air passes through the heat core, either in an upward or downward direction, and out the opposing end of the heat core. Although the efficiency of the design of FIG. 10 is not as efficient as that of FIG. 9, it is much easier to form the polystyrene material than the aluminum material, thus lessening the cost of production.

As previously discussed, the air exchanger 10 further includes fans for drawing air into the air exchanger. The first or indoor air exhaust fan 20 is positioned within the lower air passage 25 for drawing indoor air into the air exchanger through the front air inlet 18. The second or outdoor air intake fan 24 is vertically spaced from the first fan and is positioned within the upper air passage 26 for drawing outdoor air into the air exchanger through the rear air inlet 22. The fans are preferably driven by variable speed motors 43 (see FIG. 6) which are actuated by an electrical switch 44 (see FIG. 1) located inside of the front wall. An on-off control knob 45 is connected to the switch and extends outward from the front wall. An electrical cord 46, having a room outlet plug at one end, extends from the sidewall 12 and provides power to fans 20 and 24.

With reference to FIG. 3, indoor air, "I", enters the air exchanger through the front air inlet 18 and is drawn through the lower air passage 25 and into the second channels 35 of the first and second heat exchangers near their bottom ends. The indoor air traverses the second channels in an upward direction and exits the air exchanger through the rear air outlets 21'.

Similarly, with reference to FIG. 4, the outdoor air, "O", is drawn into the air exchanger through the rear air inlet 22 by fan 24, and travels through the upper air passage 26, and enters the first channels 34 of the first and second heat exchangers near their top ends. The outdoor air travels in a downward direction through the first channels and exits the air exchanger through the front air inlets 21. As shown in FIGS. 3 and 4, the indoor air enters and exits the second channel, adjacent to the rear wall 14, and the outdoor air enters and exits the first channels adjacent to the front wall.

As illustrated in FIGS. 3 and 4, the air exchanger preferably includes means for regulating airflow through the heat exchangers. As embodied herein, the regulating means includes a front baffle 47 and a rear baffle 48 associated with the first heat exchanger 30, and a front baffle 49 and a rear baffle 50 associated with the second heat exchanger 31. The front baffles regulate the flow of outdoor air through the first channels 34, and the rear baffles regulate the flow of indoor air through the second channels 35. The baffles taper along their length to thereby define open air headers or channels which decrease in cross-section or volume along their length and which function to distribute air into the heat exchangers.

The structure of the rear baffles 48 and 50 is illustrated in FIG. 3. The header space 51 is generally triangular-shaped and opens into the second channels near the bottom ends thereof. Indoor air flows from the lower air passage 25 to the second channels by passing through the hollow interior header defined by the rear baffles. The cross-sectional flow areas of the rear header decreases in the directions from the lower air passage toward the sidewalls 12 and 13. Accordingly, the air initially enters the largest volume of the header, and the indoor air enters the second channels located closest to the vertical walls 26 of the lower air passage. The volume of the header decreases along its length to compensate for air progressively entering the second channels as the air fills the header space. This more uniformly distributes the airflow along the entire length of the heat exchanger. Consequently, airflow through the heat exchangers is uniform, and airflow resistance which would cause wear on the fan 24 is reduced.

FIG. 4 illustrates the front baffles 47 and 49 which regulate the flow of outdoor air, "O", into the first channels 34 near their upper ends. The front baffles also define open tapering headers 52 having a generally triangular shape. Outdoor air flows through the upper passage 26 and then travels upwardly along the inclined baffles. The air then enters the top portion of the first channels through the air inlet portions 53 located between the surface 54 and the top wall 15. The air initially enters the largest volume of the header and enters the air inlet portions closest to the vertical walls 29 of the upper air passage 26. The header volume decreases as previously discussed to create a more uniform flow of air through the heat exchangers and reduces wear on the second fan 24.

Figure 5:
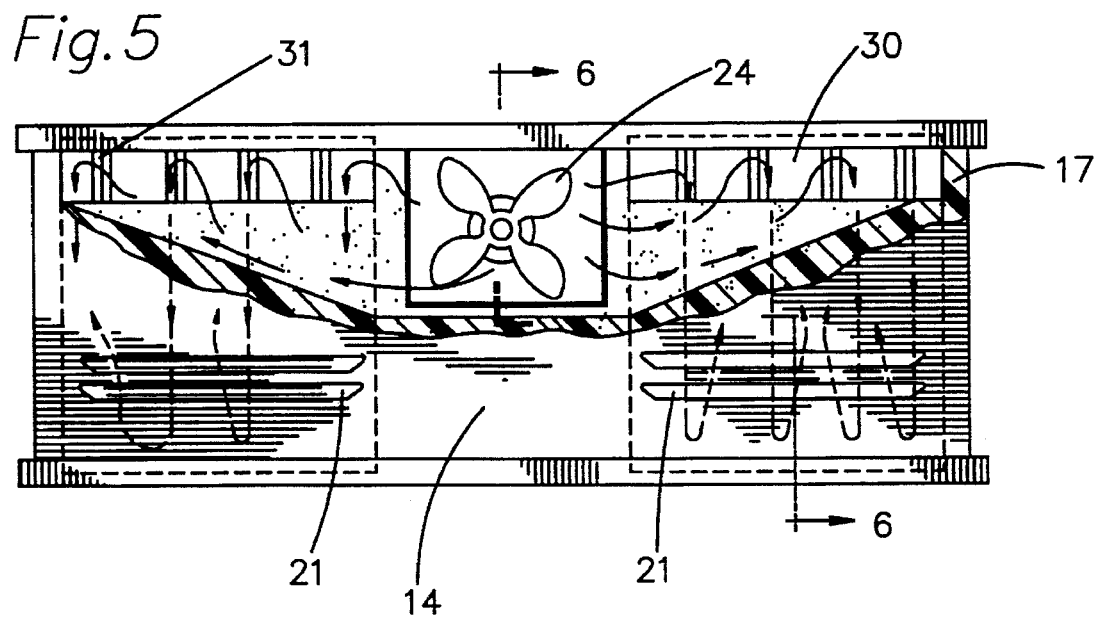
FIG. 5 is a partial cross-sectional illustrious view of the air exchanger of FIG. 4, further illustrating the flow pattern of outdoor air.
Figure 6:
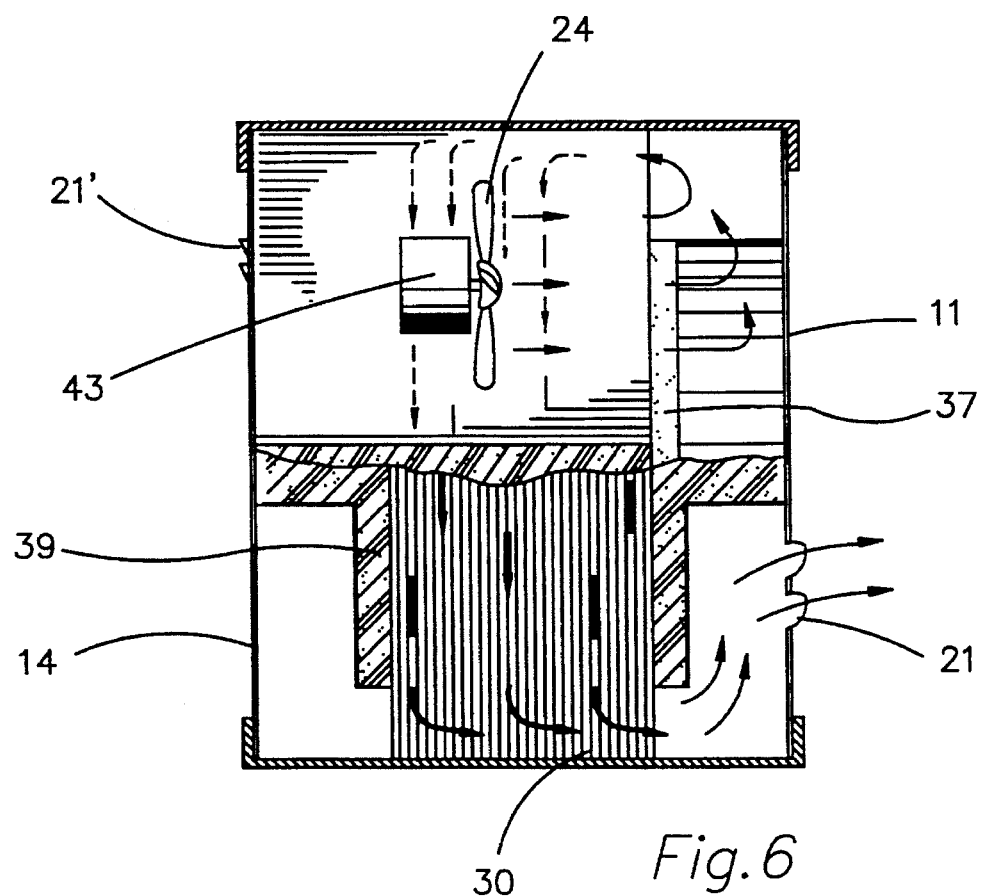
FIG. 6 is a partial cross-sectional sectional view taken along line 6—6 of FIG. 5.

FIGS. 5 and 6 further illustrate the pattern of flow of outdoor air through the heat exchangers 30 and 31 and into the indoors by way of the front air outlets 21.

The air exchanger continuously exchanges the indoor and outdoor air and, at the same time, does not significantly affect the indoor air temperature. The outdoor air is either heated or cooled as it passes through the heat exchangers, depending on the relative temperature of the indoor air traveling in a counter-direction.

In those instances when it is warmer outdoors than indoors, heat is transferred from the outdoor air to the indoor air as the two air streams travel through the heat exchangers. This heat transfer raises the indoor air temperature to a temperature intermediate the outdoor and indoor temperatures. Ignoring any minor heating effects by the motors of the fans, the heat transfer efficiency, E, may be defined as follows:

$$E=(T_o-T_e)/(T_o-T_i)$$

wherein $T_o$ is the outdoor temperature, $T_e$ is the temperature of the outdoor air as it enters the indoors, and $T_i$ is the indoor temperature. For example, if the efficiency of the heat exchangers is 0.5, the outdoor temperature is 80° F., and the indoor temperature is 60° F., $T_e$ will equal 70° F. $T_e$ will more closely approach the indoor temperature as the efficiency increases and, at a theoretical maximum efficiency of 1.0, these two temperatures will be equal.

Similarly, if the outdoor air is colder than the indoor air, heat is transferred from the indoor air to the outdoor air. This heat transfer raises the outdoor air temperature to a temperature intermediate the outdoor and indoor temperatures. In such instances, again ignoring any heating effects by the fans, E may be defined by the equation:

$$E=(T_i-T_e)/(T_i-T_o)$$

wherein the symbols have the same meaning as above. Assuming $T_o$ is 60° F., $T_i$ is 80° F. and an efficiency of 0.5, $T_e$ will again equal 70° F.

The heat exchange means, in accordance with the present invention, has a high efficiency such that the temperature of the outdoor air entering the room approaches the indoor temperature as closely as possible. Preferably, the efficiency is from about 0.5 to about 0.8 so that the temperature difference between the outdoor air that enters the room and the indoors will be minimized. This is especially important when the temperature difference between the indoors and outdoors is greatest during the coldest months of the year.

The foregoing description of the preferred embodiment of the invention has been presented to illustrate the principles of the invention and not to limit the invention to the particular embodiment illustrated. It is intended that the scope of the invention be defined by all of the embodiments encompassed within the following claims, and their equivalents.

What is claimed is:

1. An air exchanger for exchanging indoor and outdoor air, comprising:

a housing including a front wall, a rear wall, a top wall and a bottom wall, said front wall having a front air inlet and a front air outlet, said rear wall having a rear air inlet and a rear air outlet, said housing being adapted to be inserted into a window;

a heat exchanger; and fan means for drawing indoor air into said air exchanger through said front air inlet, and for drawing outdoor air into said air exchanger through said rear air inlet;

wherein said heat exchanger comprises means for exchanging heat between said indoor and said outdoor air, said heat exchange means including a heat exchanger extending between said top wall and said bottom wall and having a continuous structure defining a plurality of alternating first channels and second channels, said first channels opening toward said front wall and being closed toward said rear wall, and said second channels opening toward said rear wall and being closed toward said front wall, wherein said outdoor air traverses said first channels in a first direction and exits said air exchanger through said front air outlet, and said indoor air traverses said second channels in a second direction opposite to said first direction and exits said air exchanger through said rear air outlet;

further comprising a first front baffle defining a first airflow header for regulating the flow of said outdoor air through said first channels, and a first rear baffle defining a second airflow header for regulating the flow of said indoor air through said second channels; and wherein said heat exchange means includes a pair of spaced heat exchangers located at opposite sides of said fan means and intermediate said front wall and said rear wall.

2. The air exchanger of claim 1, in which said heat exchangers include upper and lower portions, and means for sealing said upper and lower portions with respect to said top wall and said bottom wall, respectively.

3. The air exchanger of claim 2, further comprising a first front baffle and a first rear baffle adjacent a first of said heat exchangers, and a second front baffle and a second rear baffle adjacent a second of said heat exchangers, said first and second front baffles regulating the flow of said outdoor air through said first channels and said first and second rear baffles regulating the flow of said indoor air through said second channels.

4. The air exchanger of claim 3, wherein said first and second channels are substantially parallel with respect to each other.

5. The air exchanger of claim 4, wherein said fan means comprises a first fan means for drawing said indoor air into said front air inlet, and a second fan means for drawing said outdoor air into said rear air inlet.

6. The air exchanger of claim 5, wherein said first heat exchanger includes a plurality of spacers extending into said first channels and a plurality of spacers extending into said second channels, and said second heat exchanger includes a second plurality of spacers extending into said first channels and a plurality of spacers extending into said second channels.

7. The air exchanger of claim 6, in which said first and second airflow headers are tapered outwardly relative to said fan means whereby the cross-sectional area of said headers decreases progressively outwardly relative to said fan means.

8. The air exchanger of claim 7, including a first fluid passageway extending between and communicating said front air inlet and said second airflow header, and a second fluid passageway extending between and communicating said rear air inlet and said first airflow header.

9. The air exchanger of claim 1, in which said first and second airflow headers are tapered outwardly relative to said fan means whereby the cross-sectional area of said headers decreases progressively outwardly relative to said fan means.

10. The air exchanger of claim 9, including a first fluid passageway extending between and communicating said front air inlet and said second airflow header, and a second fluid passageway extending between and communicating said rear air inlet and said first airflow header.

11. An air exchanger for exchanging indoor and outdoor air, comprising:

a housing including a front wall, a rear wall, a top wall and a bottom wall, a first aid inlet to intake indoor air and a first air outlet to outlet outdoor air, a second air inlet intake outdoor air and a second air outlet to outlet indoor air;

a heat exchange means including a first heat exchanger for exchanging heat between said indoor and said outdoor air, said first heat exchanger extending between said top wall and said bottom wall and having a continuously generally serpentine wall structure defining a plurality of alternating first channels and second channels;

a first fan means for drawing indoor air into said air exchanger through said first air inlet and a second fan means for drawing outdoor air into said air exchanger through said second air inlet, said outdoor, air traverses said first channels in a first direction and exits said air exchanger through said first air outlet, and said indoor air traverses said second channels in a second direction opposite to said first direction and exits said air exchanger through said second aid outlet;

wherein said first air channels opening toward said front wall and being closed toward said rear wall, and said second channels opening toward said rear wall and being closed toward said front wall;

a second heat exchanger extending between said top wall and said bottom wall and having a continuously generally serpentine wall structure defining a plurality of alternating first channels and second channels;

first front baffle and a first rear baffle associated with said first heat exchange means, and a second front baffle and a second rear baffle associated with said second heat exchange means, said first and second front baffles regulating the flow of said outdoor air through said first channels and said first and second rear baffles regulating the flow of said indoor air through said second channels;

means for sealing said first and second heat exchangers with respect to said top wall and said bottom wall; and wherein said first and second heat exchange means being located at opposite sides of said first and second fan means and intermediate said front wall and said rear wall.

12. An air exchanger for exchanging indoor and outdoor air, comprising:

a housing including a front wall, a rear wall, a top wall and a bottom wall, a first air inlet to intake indoor air and a first air outlet to outlet outdoor air, a second air inlet intake outdoor air and a second air outlet to outlet indoor air;

a heat exchange means including a first heat exchanger for exchanging heat between said indoor and said outdoor air, said first heat exchanger extending between said top wall and said bottom wall and having a continuously generally serpentine wall structure defining a plurality of alternating first channels and second channels;

a first fan means for drawing indoor air into said air exchanger through said first aid inlet and a second fan means for drawing outdoor air into said air exchanger through said second aid inlet, said outdoor air traverses said first channels in a first direction and exits said air exchanger through said first air outlet, and said indoor air traverses said second channels in a second direction opposite to said first direction and exits said air exchanger through said second air outlet;

wherein said first air channels opening toward said front wall and being closed toward said rear wall, and said second channels opening toward said rear wall and being closed toward said front wall;

a second heat exchanger extending between said top wall and said bottom wall and having a continuously generally serpentine wall structure defining a plurality of alternating first channels and second channels;

first front baffle and a first rear baffle associated with said first heat exchange means, and a second front baffle and a second rear baffle associated with said second heat exchange means, said first and second front baffles regulating the flow of said outdoor air through said first channels and said first and second rear baffles regulating the flow of said indoor air through said second channels;

means for sealing said first and second heat exchangers with respect to said top wall and said bottom wall; and wherein each of said first and second heat exchangers include a plurality of spacers extending into said first channels and a plurality of spacers extending into said second channels.

13. The air exchanger of claim 12, in which said serpentine wall structure is corrugated and includes wall segments which are closely spaced so that the corrugations are in proximate spaced relationship with one another.

14. The air exchanger of claim 13, in which said wall segments are generally parallel to one another.

15. An air exchanger for exchanging indoor and outdoor air, comprising:

a housing including a front wall, a rear wall, it top wall and a bottom wall, a first aid inlet to intake indoor air and a first air outlet to outlet outdoor air, a second air inlet intake outdoor air and a second air outlet to outlet indoor air;

a heat exchange means including a first heat exchanger for exchanging heat between said indoor and said outdoor air, said first heat exchanger extending between said top wall and said bottom wall and having a continuously generally serpentine wall structure defining a plurality of alternating first channels and second channels;

a first fan means for drawing indoor air into said air exchanger through said first air inlet and a second fan means for drawing outdoor air into said air exchanger through said second air inlet, said outdoor air traverses said first channels in a first direction and exits said air exchanger through said first air outlet, and said indoor air traverses said second channels in a second direction opposite to said first direction and exits said air exchanger through said second air outlet;

wherein said first air channels opening toward said front wall and being closed toward said rear wall, and said second channels opening toward said rear wall and being closed toward said front wall;

a second heat exchanger extending between said top wall and said bottom wall and having a continuously generally serpentine wall structure defining a plurality of alternating first channels and second channels;

first front baffle and a first rear baffle associated with said first heat exchange means, and a second front baffle and a second rear baffle associated with said second heat exchange means, said first and second front baffles regulating the flow of said outdoor air through said first channels and said first and second rear baffles regulating the flow of said indoor air through said second channels;

means for sealing said first and second heat exchangers with respect to said top wall and said bottom wall; and in which said serpentine wall structure is corrugated and includes wall segments which are closely spaced so that the corrugations are in proximate spaced relationship with one another.

\* \* \* \* \*